United States Patent [19]

Quinlan

[11] Patent Number: 4,670,186

[45] Date of Patent: Jun. 2, 1987

[54] ACID INHIBITOR COMPOSITION

[75] Inventor: Patrick M. Quinlan, St. Louis, Mo.

[73] Assignee: Petrolite Corporation, St. Louis, Mo.

[21] Appl. No.: 450,607

[22] Filed: Dec. 17, 1982

[51] Int. Cl.$^4$ ............................................. B66D 3/04
[52] U.S. Cl. ...................................... 252/392; 252/146;
252/148; 252/8.553; 252/8.555
[58] Field of Search ............. 252/392, 8.55 C, 8.55 E,
252/146, 148

[56] References Cited

U.S. PATENT DOCUMENTS

| | | | |
|---|---|---|---|
| 2,758,970 | 8/1956 | Saukaitis et al. ................ | 252/8.55 E |
| 3,294,694 | 12/1966 | Wood et al. ......................... | 252/146 |
| 3,428,566 | 2/1969 | Herman et al. ..................... | 252/146 |
| 3,632,524 | 1/1972 | Muzyczko et al. ................ | 252/148 |
| 3,676,354 | 7/1972 | Kaneko et al. ..................... | 252/148 |
| 4,405,494 | 9/1983 | Oppenlaender et al. ........... | 252/392 |

FOREIGN PATENT DOCUMENTS

| | | | |
|---|---|---|---|
| 0620415 | 5/1961 | Canada ........................... | 252/8.55 E |
| 0847762 | 9/1960 | United Kingdom .......... | 252/8.55 C |

*Primary Examiner*—Christine M. Nucker
*Attorney, Agent, or Firm*—Robert E. Wexler

[57] ABSTRACT

There is described a composition comprising an acylated, alkylated polyamine, an alkylated polyamine, an alkynol and a surfactant. The compositions are useful as corrosion inhibitors for acid systems and ferrous pickling systems and in acidizing media in the treatment of oil-bearing earth formations.

37 Claims, No Drawings

ACID INHIBITOR COMPOSITION

BACKGROUND OF THE INVENTION

This invention relates to corrosion inhibiting compositions and to a process for inhibiting corrosion of metals, particularly iron, steel and ferrous alloys.

The corrosion inhibitor composition finds special utility in the prevention of corrosion of pipe or equipment which is in contact with corrosive oil-containing media as, for example, in oil wells producing corrosive oil or oil-brine mixtures, in refineries, in ferrous pickling media and in the acidizing of calcareous earth formations. The inhibitor compositions are useful in systems where sulfuric, hydrochloric, nitric, phosphoric, acetic acids or their equivalent acid salts, such as sulfates, chlorides, nitrates, phosphates and the like are employed.

SUMMARY OF THE INVENTION

It has now been discovered that corrosion of the types described above is inhibited by a composition comprising an acylated, alkylated polyalkylene polyamine, an alkylated polyalkylenepolyamine, an alkynol and a surfactant.

SPECIFIC EMBODIMENTS OF THE INVENTION

Among the polyamines employed herein are polyalkylenepolyamines, for example, of the formula

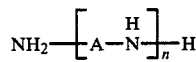

where n is an integer, for example 1 to 25 or more, such as 2 to 10, but preferably 2 to 5, and A is an alkylene group —(CH$_2$)$_m$— where m is 2 to 10 or more, but preferably ethylene or propylene.

One or more of the hydrogens on the CH$_2$ group may be substituted, for example, by such groups as alkyl groups, for example, methyl, ethyl, etc. Examples of A include

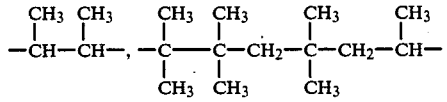

etc.

Examples of polyamines include the following: diethylene triamine, dipropylene triamine, triethylene tetramine, tripropylene tetramine, tetraethylene pentamine, tetrapropylene pentamine, polyalkyleneimines, i.e., the higher molecular weight amines derived from alkyleneimines such as polyethyleneimines, polypropyleneimines, for example, having 50, 100 or more alkylene amino units, etc. Mixtures of the above polyamine amines and those polyamines containing both ethylene and propylene groups can be employed, for example:

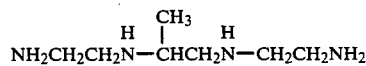

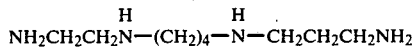

The above described polyamines can be acylated by reaction with a monocarboxylic acid to form an amino amide. For example, one mole of a monocarboxylic acid may be reacted with one mole of a polyalkylenepolyamine to form one mole of an amino amide, such as:

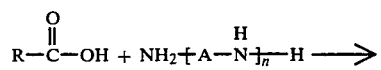

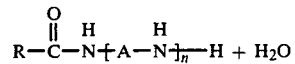

wherein R represents, alkyl, aryl, aralkyl, cycloalkyl or cyclodiene and A and n are defined above.

Acids suitable in the practice of this invention include saturated, aliphatic monocarboxylic acids, such as acetic, propionic, valeric, caprylic, pelargonic, lauric, myristic, palmitic, stearic; unsaturated aliphatic monocarboxylic acids, such as oleic acid; aromatic monocarboxylic acids, such as benzoic, toluic, hydroxybenzoic, anisic; aromatic monocarboxylic acids, such as naphthoic acid, terpene acids such as abietic, dehydroabietic acids; resin acids, such as pimaric acid and the like.

The amidopolyamine products derived as described above can be further reacted with a suitable alkylating agent to produce an amido-containing alkylated polyamine. For example:

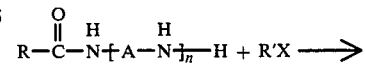

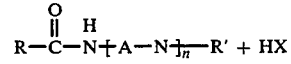

wherein R, A and n are defined above, R' represents alkyl, aryl, alkaryl, cycloalkyl, and X represents halogen, e.g., chloro, fluoro or bromo.

In like manner, polyalkylenepolyamines can be reacted with an alkylating agent, using various molar ratios of the alkylating agent, to afford the alkylated polyalkylenepolyamine component of the inhibitor composition.

The alkynols used in the composition of this invention include: propargyl alcohol, 2-methyl-3-butyn-2-ol, 2,5-dimethyl-3-butyn-2,5-diol, butynediol, 1-hyxyn-3-ol, 1-octyn-3-ol, 1-propyn-3-ol, 3-methyl-1-butyn-3-ol and the like.

A commercial hydroxy composition is OW-1 (Airco) which is a proprietary mixture of acetylenic compounds.

The surfactant employed should be soluble or dispersible in the corrosion inhibiting system. In general it is an oxyalkylated material which is water soluble or dispersible so that it enhances corrosion inhibition.

Any suitable surfactant can be employed. The surfactants which are most usually employed in the practice of this invention are oxyalkylated surfactants or, more specifically, polyalkylene ether or polyoxyalkylene surfactants. Oxyalkylated surfactants as a class are well known. The possible subclasses and specific species are legion. The methods employed for the preparation of such oxyalkylated surfactants are also too well known to require much elaboration. Most of these surfactants contain, in at least one place in the molecule and often in several places, an alkanol or a polyglycolether chain. These are most commonly derived by reacting a starting molecule, possessing one or more oxyalkylatable reactive groups, with an alkylene oxide such as ethylene oxide, propylene oxide, butylene oxide, etc. However, they may be obtained by other methods such as shown in U.S. Pat. Nos. 2,588,771 and 2,596,091 or by esterification or amidification with an oxyalkylated material, etc. Mixtures of oxides may be used as well as successive additions of the same or different oxides may be employed. Any oxyalkylatable material may be employed. As typical starting materials may be mentioned alkyl phenols, phenolic resins, alcohols, glycols, amines, organic acids, carbohydrates, mercaptans, and partial esters of polybasic acids. In general, the art teaches that, if the starting material is water-soluble, it may be converted into an oil-soluble surfactant by the addition of polypropoxy or polybutoxy chains. If the starting material is oil-soluble, it may be converted into a water soluble product. Subsequent additions of ethoxy units to the water-soluble surfactant by the addition of polyethoxy chains tend to increase the water solubility. In general, the final solubility and surfactant properties are a result of a balance between the oil-soluble and water-soluble portions of the molecule.

In the practice of this invention it has been found that suitable surfactants may be prepared from a wide variety of starting materials. For instance, if one begins with an oil-soluble material, such as phenol or a long chain fatty alcohol, and prepares a series of products by reaction with successive portions of ethylene oxide, the members of the series are successively more water-soluble. Similarly, it is possible to start with water or a water-soluble material, such as polyethylene glycol, and add, successively, portions of propylene oxide. The members of this series will be progressively less water-soluble and more oil-soluble. There will be a preferred range where the materials are useful for the practice of this invention.

In general, the compounds which would be selected are oxyalkylated surfactants of the general formula

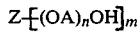

wherein Z is the oxyalkylatable material, A is the radical derived from the alkylene oxide which can be, for example, ethylene, propylene, butylene, and the like, n is a number determined by the moles of alkylene oxide reacted, for example 1 to 2000 or more and m is a whole number determined by the number of reactive oxyalkylatable groups. Where only one group is oxyalkylatable as in the case of a monofunctional phenol or alcohol, R'OH, then m=1. Where Z is water, or a glycol, m=2. Where Z is glycerol, m=3, etc.

In certain cases, it is advantageous to react alkylene oxides with the oxyalkylatable material in a random fashion so as to form a random copolymer on the oxyalkylene chain, i.e., the —(OR)$_n$OH]$_m$ chain such as —AABAAABBABABBABBA—. In addition, the alkylene oxides can be reacted in an alternate fashion to form block copolymers on the chain, for example

—BBBAAABBBAAAABBBB— or

BBBBAAACCCAAAABBBB— where A is the unit derived from one alkylene oxide, for example ethylene oxide, and B is the unit derived from a second alkylene oxide, for example propylene oxide, and C is the unit derived from a third alkylene oxide, for example, butylene oxide, etc. Thus, these compounds include terpolymers or higher copolymers polymerized randomly or in a blockwise fashion or many variations or sequential additions.

Thus, —(OR)—$_N$ in the above formula can be written —A$_a$B$_b$C$_c$— or any variation thereof, wherein a, b and c are 0 or a number, provided that at least one of them is greater than 0.

It cannot be overemphasized that the nature of the oxyalkylatable starting material used in the preparation of the surfactant is not critical. Any species of such material can be employed. By proper additions of alkylene oxides, this starting material can be rendered suitable as a surfactant and its suitability can be evaluated by testing in the corrosion system.

REPRESENTATIVE EXAMPLES OF Z

| NO. | Z |
|---|---|
| 1 | $\underset{\text{RC—O—}}{\overset{\text{O}}{\|}}$ |
| 2 | R$_n$—⟨ ⟩—O— |
| 3 | R—O— |
| 4 | R—S— |
| 5 | $\underset{\text{R—C—N—}}{\overset{\text{O  H}}{\|}}$ |
| 6 | $\underset{\text{R—C—N}\diagdown}{\overset{\text{O}}{\|}}\diagup$ |
| 7 | $\underset{\text{R—N—}}{\overset{\text{H}}{\|}}$ |
| 8 | RN$\diagup$$\diagdown$ |
| 9 | Phenol-aldehyde resins |
| 10 | —O— (Ex: Alkylene oxide block polymers) |
| 11 |  |
|  | X = O, —S—, —CH$_2$—S(=O)$_2$—, etc. |
| 12 | R—S—CH$_2$C(=O)—O— |
| 13 | RPO$_4$H |
| 14 | RPO$_4$= |
| 15 | PO$_4$= |

| NO. | Z |
|---|---|
| 16 | $R_n$—⬡—$SO_2N$(H)— |
| 17 | R—⬡—$SO_2N$= |
| 18 | RC(=O)—N(H)—⬡—N< |
| 19 | Polyol-derived (Ex. glycerol, glucose, pentaerithrytol). |
| 20. | Anhydrohexitan or anhydrohexide derived (Spans and Tweens). |
| 21 | Polycarboxylic derived. |
| 22 | —(CHCH$_2$—O)$_n$—<br>  \|<br>  CH$_2$<br>   \<br>    amino |

Examples of oxyalkylatable materials derived from the above radicals are legion and these, as well as other oxyalkylatable materials, are known to the art. A good sorce of such oxyalkylatable materials, as well as others, can be found in "Surface Active Agents and Detergents," vols. 1 and 2, by Schwartz et. al., Interscience Publishers (vol. 1, 1949, vol. 2, 1958), and the patents and references referred to therein.

The acid corrosion inhibitor comprises from about 5-90% acylated, alkylated polyalkylenepolyamine, such as from about 10-80% but preferably from 15-75%; from about 5-80% alkylated polyalkylene polyamine, such as from 10-60% but preferably from 15-50%; from about 1-50% of the alkynol, such as from about 5-40%, but preferably from 10-30% and from about 5-50% surfactant, such as from about 10-40%, but preferably from 15-30%. In practice the composition generally contains some water and alcohol to render the composition more fluid.

The following examples illustrate specific, nonlimiting embodiments of the invention, including the best mode of practice of the invention.

Examples 1-9 illustrate the preparation of acylated, alkylated polyalkylenepolyamines.

EXAMPLE 1

A mixture of triethylenetetramine (1 mol, 146 gms) and benzoic acid (1 mol, 122.1 gms) was stirred and heated in vacuo at 65°-80° C. for a period of 3 hours. The water of condensation was collected in a Barret water trap. The product was an acylated polyalkylenepolyamine.

To this product were added 268 gms of 2-propanol. The resulting solution was heated to reflux and 2 mols (253.2 gms) benzyl chloride were added over a period of 2 hours. The resulting solution was an acylated, alkylated polyalkylenepolyamine.

EXAMPLE 2

A mixture of tetraethylenepentamine (1 mol, 189 gms) and abietic acid (1 mol, 268 gms) was stirred and heated in vacuo at 200° C. for a period of 3 hours. The water of condensation was collected. The product was an acylated polyalkylenepolyamine. The product was dissolved in 500 gms of 2-propanol and heated with stirring to reflux. Benzyl chloride (0.25 mol, 31.7 gms) was slowly added over a period of 2 hours. The resulting product was an acylated, alkylated polyalkylenepolyamine.

EXAMPLE 3

Triethylenetetramine (1 mol, 146 gms) was stirred and heated in vacuo at 250° C. with a commercial mixture of hydrogenated wood rosin acids (1 mol, 340 gms) for a period of 4 hours. The resulting mixture was an acylated polyalkylenepolyamine.

The mixture was dissolved in 500 gms of 2-propanol. The resulting solution was heated to reflux and benzyl chloride (0.5 mol, 63.45 gms) was added over a period of 2 hours. The resulting solution was an acylated, alkylated polyalkylenepolyamine.

Other specific examples of acylated, alkylated polyalkylene polyamines prepared by similar techniques are presented in the following table.

| Ex. | Polyalkylenepolyamine (mol) | Acid (mol) | Alkylating Agent (mol) |
|---|---|---|---|
| 4 | Diethylenetriamine (1) | Propionic (1) | Butyl Bromide (1) |
| 5 | Tetraethylenepentamine (1) | Benzoic (1) Acetic (2) | Methyl Chloride (2) |
| 6 | Tetraethylenepentamine (1) | Butyric (2) | Ethyl Iodide (2) |
| 7 | Diethylenetriamine (1) | Abietic (1) Acetic (1) | Benzyl Chloride (0.25) |
| 8 | Diethylenetriamine (1) | Hydrogenated Wood Rosin Acids (1) Acetic Acid (1) | Benzyl Chloride (0.25) |
| 9 | Tetraethylenepentamine (1) | Abietic (1) Propionic (1) | Hexyl Iodide (0.5) |

The following examples illustrate the preparation of alkylated polyalkylenepolyamines.

EXAMPLE 10

Diethylenetriamine (1 mol, 103.2 gms) was dissolved in 172.0 gms of water and 180.0 gms of 2-propanol and heated to reflux. One mol (249 gms) of bromodecane was added over a period of 2 hours. The product was an alkylated polyalkylenepolyamine.

EXAMPLE 11

Tetraethylenepentamine (0.5 mol, 94.5 gms) was dissolved in 422.0 gms of water and heated to reflux with stirring. Benzyl chloride (2.5 mols, 317.5 gms) was added over a period of 2 hours. The product was an alkylated polyalkylenepolyamine.

The following examples were prepared in a similar manner.

| EX. | Polyalkylenepolyamine (mol) | Alkylating Agent (mol) |
|---|---|---|
| 12 | Triethylenetetramine (1) | Methyl Chloride (4) |
| 13 | Pentaethylenehexamine (1) | Benzyl Chloride (7) |
| 14 | Pentaethylenehexamine (0.5) | Butyl Bromide (3) |
| 15 | Tetraethylenepentamine (0.5) | Hexyliodide (3) |
| 16 | Tetraethylenepentamine (0.5) | Bromodecane (1.5) |

The following examples illustrate corrosion inhibiting formulations of this invention. Parts and properties are by weight.

EXAMPLE 17

| | % |
|---|---|
| Acylated, Alkylated Polyalkylenepolyamine from Ex. 1 | 30 |
| Alkylated Polyalkylenepolyamine from Ex. 11 | 20 |
| Propargyl Alcohol | 10 |
| Nonylphenol Condensed with 10 mols Ethylene Oxide | 15 |
| 2-Propanol | 15 |
| Water | 10 |
| | 100 |

EXAMPLE 18

| Acylated, Alkylated Polyalkylenepolyamine from Ex. 2 | 25 |
|---|---|
| Alkylated Polyalkylenepolyamine from Ex. 13 | 15 |
| Propargyl Alcohol | 15 |
| Nonylphenol Condensed with 15 mols Ethylene Oxide | 20 |
| 2-Propanol | 15 |
| Water | 10 |
| | 100 |

EXAMPLE 19

| Acylated, Alkylated Polyalkylenepolyamine from Ex. 3 | 25 |
|---|---|
| Alkylated Polyalkylenepolyamine from Ex. 13 | 15 |
| 1-Hexyn-3-ol | 12 |
| Stearylamine Condensed with 23 mols Ethylene Oxide | 15 |
| 2-Propanol | 20 |
| Water | 13 |
| | 100 |

EXAMPLE 20

| | % |
|---|---|
| Acylated, Alkylated Polyalkylenepolyamine from Ex. 7 | 20 |
| Alkylated Polyalkylenepolyamine from Ex. 15 | 20 |
| 1-Octyn-3-ol | 10 |
| Propargyl Alcohol | 5 |
| Octylphenol Condensed with 10 mols Ethylene Oxide | 15 |
| 2-Propanol | 20 |
| Water | 10 |
| | 100 |

EXAMPLE 21

| Acylated, Alkylated Polyalkylenepolyamine from Ex. 8 | 25 |
|---|---|
| Alkylated Polyalkylenepolyamine from Ex. 13 | 15 |
| Propargyl Alcohol | 10 |
| Stearyl Amine Condensed with 23 mols Ethylene Oxide | 15 |
| 2-Propanol | 25 |
| Water | 10 |
| | 100 |

EXAMPLE 22

| Acylated, Alkylated Polyalkylenepolyamine from Ex. 8 | 25 |
|---|---|
| Alkylated Polyalkylenepolyamine from Ex. 2 | 20 |
| OW-1 | 10 |
| Dehydroabietylamine Condensed with 11 mols Ethylene Oxide | 15 |
| 2-Propanol | 20 |
| Water | 10 |
| | 100 |

To avoid repetitive detail, the following table further illustrates the compositions of this invention.

| Ex. | Acylated Alkylated, Polyalkylenepolyamine (%/wgt.) | Alkylated Polyalkylenepolyamine (%/wgt.) | Non-ionic Surfactant (%/wgt.) | Alkynol (%/wgt) | Alcohol (%/wgt.) | Water (%/wgt.) |
|---|---|---|---|---|---|---|
| 23 | From Ex. 1 (30) | From Ex. 15 (20) | Dinonyphenol + 18 mols Ethylene oxide (15) | OW-1 (15) | Methanol (10) | (10) |
| 24 | From Ex. 9 (25) | From Ex. 16 (25) | Dodecyl Alcohol + 20 mols Ethylene Oxide (15) | Propargyl Alcohol (15) | Methanol (10) | (10) |
| 25 | From Ex. 4 (35) | From Ex. 14 (10) | Nonylphenol + 15 mols Ethylene Oxide (15) | 1-Octyn-3-Ol (10) | 2-Propanol (20) | (10) |
| 26 | From Ex. 7 (25) | From Ex. 13 (15) | Stearylamine + 25 mols Ethylene Oxide (15) | Propargyl Alcohol (10) | Methanol (20) | (15) |
| 27 | From Ex. 2 (25) | From Ex. 8 (15) | Nonylphenol + 15 mols Ethylene Oxide (15) | Propargyl Alcohol (15) | 2-Propanol (20) | (10) |

CORROSION TEST PROCEDURES

In these tests the acid solutions were prepared by diluting concentrated hydrochloric acid with water to the desired concentrations.

Corrosion coupons of 1010 steel (AISI) were pickled in an uninhibited 10% solution for 10 minutes, neutralized in a 10% solution of $NaHCO_3$, dipped in acetone to remove water and allowed to dry. They were then weighed to the nearest milligram and stored in a dessicator.

In most of the tests, a 25 $cc/in^2$ acid volume to coupon surface area ratio was used. After the desired amount of acid was poured into glass bottles, the inhibitor was added. The inhibited acid solution was then placed in a water bath which had been set at a predetermined temperature and allowed to preheat for 20 minutes. The coupons were then placed in the preheated, inhibited acid solutions. The coupons were left in the acid solutions for the specified test time, removed, neutralized, recleaned, rinsed, dipped in acetone, allowed to dry, then reweighed.

The inhibitor compositions of the invention were employed to inhibit corrosion in a 5% hydrochloric acid solution. The tests were run at 65° C. for 6 hours. The test metal was AISI 1010 mild steel coupons, 8.9×2.2×0.32 cm. Inhibitor was employed at 0.1% by volume. The results of the test are tabulated in the table below.

TABLE III

| Example | Corrosion Rate (kgs/cms$^2$/day) |
| --- | --- |
| Blank | 31.6 |
| 17 | 1.05 |
| 18 | 0.72 |
| 19 | 0.76 |
| 20 | 0.84 |
| 21 | 0.51 |
| 22 | 0.42 |
| 23 | 1.05 |
| 24 | 1.10 |
| 25 | 1.14 |
| 26 | 0.80 |
| 27 | 0.93 |

USE AS PICKLING INHIBITORS

To prepare ferrous metal sheet, strip, etc., for subsequent processing, it is frequently desirable to remove oxide coating, formed during manufacturing, from the surface. The presence of oxide coating, referred to as "scale" is objectionable when the material is to undergo subsequent processing. Thus, for example, oxide scale must be removed and a clean surface provided if satisfactory results are to be obtained from hot rolled sheet and strip in any operation involving deformation of the product. Similarly, steel prepared for drawing must possess a clean surface and removal of the oxide scale therefrom is essential since the scale tends to shorten drawing-die life as well as destroy the surface smoothness of the finished product. Oxide removal from sheet or strip is also necessary prior to coating operations to permit proper alloying or adherence of the coating to the ferrous metal strip or sheet. Prior to cold reduction, it is necessary that the oxide formed during hot rolling be completely removed to preclude surface irregularities and enable uniform reduction of the work. The chemical process used to remove oxide from metal surfaces is referred to as "pickling". Typical pickling processes involve the use of aqueous acid solutions, usually inorganic acids, into which the metal article is immersed. The acid solution reacts with the oxides to form water and a salt of the acid. A common problem in this process is "overpickling" which is a condition resulting when the ferrous metal remains in the pickling solution after the oxide scale is removed from the surface and the pickling solution reacts with the ferrous base metal. An additional difficulty in pickling results from the liberated hydrogen being absorbed by the base metal and causing hydrogen embrittlement. To overcome the aforementioned problems in pickling, it has been customary to add corrosion inhibitors to the pickling solution.

The present invention avoids the above-described problems in pickling ferrous metal articles and provides a pickling composition which minimizes corrosion, overpickling and hydrogen embrittlement. Thus, the pickling inhibitors described herein not only prevent excessive dissolution of the ferrous base metal, but effectively limit the amount of hydrogen absorption thereby during pickling. According to the invention, a pickling composition for ferrous metal is provided which comprises a pickling acid such as sulfuric or hydrochloric acid and a small but effective amount of the composition of this invention, for example at least about 5 ppm, such as from about 100 to 10,000 ppm, for example from about 250 to 5,000, but preferably from about 500 to 2,500 ppm.

Ferrous metal articles are pickled by contacting the surface (usually by immersion in the pickling solution) with a pickling composition as described to remove oxide from their surface with minimum dissolution and hydrogen embrittlement thereof and then washing the ferrous metal to remove the pickling composition therefrom.

USE IN ACIDIZING EARTH FORMATIONS

The compositions of this invention can also be used as corrosion inhibitors in acidizing media employed in the treatment of deep wells to reverse the production of petroleum or gas therefrom and more particularly to an improved method of acidizing a calcareous or magnesium oil-bearing formation.

It is well known that production of petroleum or gas from a limestone, dolomite, or other calcareous-magnesian formation can be stimulated by introducing an acid into the producing well and forcing it into the oil or gas bearing formation. The treating acid, commonly a mineral acid such as HCl, is capable of forming water soluble salts upon contact with the formation and is effective to increase the permeability thereof and augment the flow of petroleum to the producing well.

Introduction of the treating acid into the well corrodes metal equipment with which it comes into contact, necessitating frequent maintenance and replacement.

The inhibiting composition of the present invention affords less frequent maintenance and replacement of equipment, thereby reducing costs.

According to the present invention, the inhibiting composition is added to the acidizing medium in a small but effective amount to inhibit corrosion of equipment in contact therewith. The amount of inhibiting composition which is added is from about 100 to 10,000 ppm, for example from about 250 to 5,000 ppm, but preferably from about 500 to 2,500 ppm.

While the illustrative embodiments of the invention have been described here and above with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

The embodiments of this invention in which an exclusive property or privelege is claimed are defined as follows:

1. A composition comprising an acylated, alkylated polyalkylenepolyamine, an alkylated polyalkylenepolyamine, an alkynol and a surfactant.

2. Composition of claim 1 wherein the acylated, alkylated polyalkylenepolyamine is prepared by alkylating the reaction product of triethylenetetramine and benzoic acid.

3. Composition of claim 1 wherein the acylated alkylated polyalkylenepolyamine is prepared by alkylating the reaction product of tetraethylenepentamine with abietic acid.

4. Composition of claim 1 wherein the acylated, alkylated polyalkylenepolyamine is prepared by alkylating the reaction product of triethylenetetramine and a mixture of hydrogenated wood rosin acids.

5. Composition of claim 1 wherein the acylated, alkylated polyalkylenepolyamine is prepared by alkylating the reaction product of diethylenetriamine and propionic acid.

6. Composition of claim 1 wherein the acylated, alkylated polyalkylenepolyamine is prepared by alkylating the reaction product of tetraethylenepentamine and a mixture of benzoic acid and acetic acid.

7. Composition of claim 1 wherein the acylated, alkylated polyalkylenepolyamine is prepared by alkylating the reaction product of tetraethylenepentamine and butyric acid.

8. Composition of claim 1 wherein the acylated, alkylated polyalkylenepolyamine is prepared by alkylating the reaction product of diethylene triamine and a mixture of abietic and acetic acids.

9. Composition of claim 1 wherein the acylated, alkylated polyalkylenepolyamine is prepared by alkylating the reaction product of diethylenetriamine and a mixture of hydrogenated wood rosin acids and acetic acid.

10. Composition of claim 1 wherein the acylated, alkylated polyalkylenepolyamine is prepared by alkylating the reaction product of tetraethylenepentamine and a mixture of abietic and propionic acids.

11. Composition of claim 1 wherein the alkylated polyalkylenepolyamine is prepared by alkylating diethylenetriamine.

12. Composition of claim 1 wherein the alkylated polyalkylenepolyamine is prepared by alkylating tetraethylenepentamine.

13. Composition of claim 1 wherein said alkylated polyalkylenepolyamine is prepared by alkylating triethylenetetramine.

14. Composition of claim 1 wherein the alkylated polyalkylenepolyamine is prepared by alkylating pentaethylenehexamine.

15. Composition of claim 1 wherein the alkynol is propargyl alcohol.

16. Composition of claim 1 wherein the alkynol is 1-hexyn-3-ol.

17. Composition of claim 1 wherein the alkynol is a mixture of 1-octyn-3-ol and propargyl alcohol.

18. Composition of claim 1 wherein the alkynol is a mixture of acetylenic alcohols.

19. Composition of claim 1 wherein the surfactant is represented by the general formula

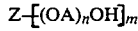

wherein Z is an oxyalkylatable material, A is the radical derived from an alkylene oxide, n is a number determined by the mols of alkylene oxide reacted and m is a whole number determined by the number of reacted oxyalkylated groups.

20. Composition of claim 1 wherein the acylated, alkylated polyalkylenepolyamine is present in an amount of from about 5 to about 90% by weight.

21. Composition of claim 1 wherein said acylated, alkylated polyalkylenepolyamine is present in an amount from about 10 to about 80% by weight.

22. Composition of claim 1 wherein said acylated, alkylated polyalkylenepolyamine is present in an amount from about 15 to about 75% by weight.

23. Composition of claim 1 wherein said alkylated polyalkylenepolyamine is present in an amount from about 5 to about 80% by weight.

24. Composition of claim 1 wherein the alkylated polyalkylenepolyamine is present in an amount of from about 10 to about 60% by weight.

25. Composition of claim 1 wherein the alkylated polyalkylenepolyamine is present in the amount from about 15 to about 50% by weight.

26. Composition of claim 1 wherein the alkynol is present in an amount from about 1 to about 50% by weight.

27. Composition of claim 1 wherein the alkynol is present in an amount from abut 5 to about 40% by weight.

28. Composition of claim 1 wherein the alkynol is present in an amount of from about 10 to about 30% by weight.

29. Composition of claim 1 wherein the surfactant is present in an amount of from about 5 to about 50% by weight.

30. Composition of claim 1 wherein the surfactant is present in the amount of from about 10 to about 40% by weight.

31. Composition of claim 1 wherein the surfactant is present in an amount of from about 15 to 30% by weight.

32. A composition comprising from about 15 to about 75% by weight of an acylated alkylated polyalkylenepolyamine derived from diethylenetriamine, from about 15 to abut 50% by weight of an alkylated polyalkylenepolyamine derived from pentaethylenehexamine, from about 10 to about 30% by weight propargyl alcohol and from about 15 to about 30% by weight of a surfactant prepared by the condensation of stearyl amine and ethylene oxide.

33. A composition comprising from about 15 to about 75% by weight of an acylated, alkylated polyalkylenepolyamine derived from diethylenetriamine, from about 15 to about 50% by weight of an alkylated polyalkylenepolyamine derived from tetraethylenepentamine, from about 10 to about 30% by weight of a mixture of acetylenic alcohols and from about 15 to about 30% by weight of a surfactant derived from the condensations of dehydroabietylamine and ethylene oxide.

34. Process of inhibiting corrosion in acid systems which comprises adding to said systems an effective, corrosion-inhibiting amount of the composition of claim 1.

35. A corrosion inhibited ferrous metal pickling medium comprising an aqueous solution of an acid and an effective corrosion-inhibiting amount of the composition of claim 1.

36. A corrosion inhibited earth formation acidizing medium comprising an acid and an effective corrosion-inhibiting amount of the composition of claim 1.

37. A corrosion inhibited acid system containing an effective corrosion-inhibiting amount of the composition of claim 1.

* * * * *